Nov. 27, 1962   C. R. PUTERBAUGH   3,065,660
FASTENER FOR LICENSE PLATES AND THE LIKE
Filed March 11, 1960   2 Sheets-Sheet 2

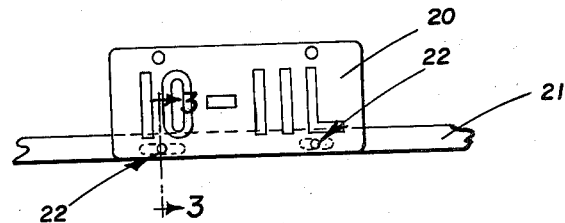
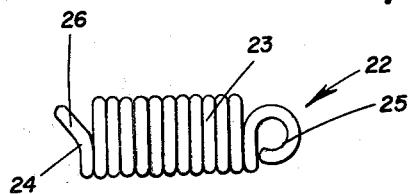
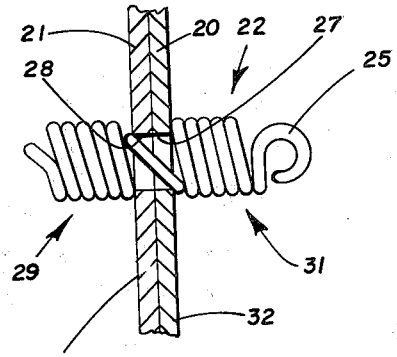
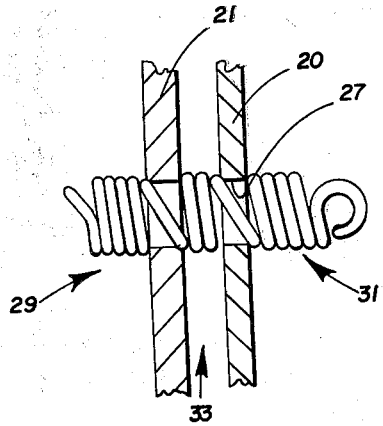
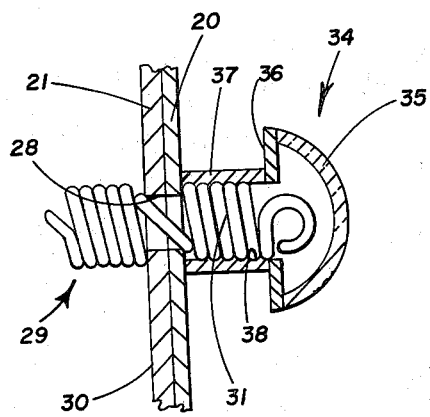
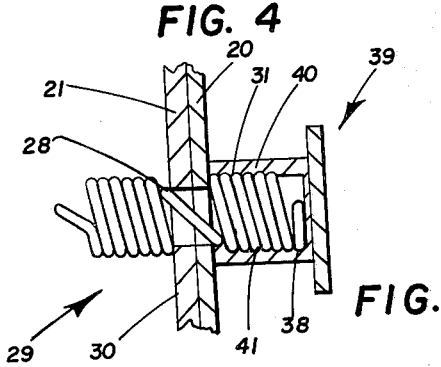

INVENTOR.
CHARLES RAY PUTERBAUGH
BY GLEIM & CANDOR
ATTORNEYS

United States Patent Office 3,065,660
Patented Nov. 27, 1962

3,065,660
FASTENER FOR LICENSE PLATES AND THE LIKE
Charles Ray Puterbaugh, 5833 White Oak Drive, Dayton 32, Ohio
Filed Mar. 11, 1960, Ser. No. 14,244
1 Claim. (Cl. 85—5)

This invention relates to an improved fastening means, and, more particularly, to a fastening means for readily and detachably securing a plate, such as a license or reflector plate, to a supporting bracket by being threadably received in aligned apertures formed in the plate and the bracket.

It is well known that it is rather difficult to secure license plates to a vehicle supporting bracket by the conventional nut and bolt arrangement because of the confining space between the bracket and the vehicle. Accordingly, many attempts have been made to eliminate ordinary bolt, lock washer and nut combinations to provide improved fasteners which can be readily adaptable to secure the license plates to their respective supporting brackets with a minimum of effort and time.

Accordingly, one of the objects of this invention is to provide an improved fastening means for readily and detachably securing license plates and the like to their respective vehicle supporting brackets.

Another object of this invention is to provide an improved fastener.

A further object of this invention is to provide an improved fastener for license plates or the like and having means for carrying a reflector thereon.

Another object is to provide an improved fastener for license plates or the like and having means for carrying an information plate or the like thereon.

Other objects, uses and advantages of this invention will become apparent upon a reading of the following specification, taken in conjunction with the accompanying drawings forming a part thereof and wherein:

FIGURE 1 is a front view of a license plate secured to a supporting bracket of the vehicle by the fastener of this invention;

FIGURE 2 is an enlarged side view of the fastener of this invention;

FIGURE 3 is a fragmentary, cross-sectional view taken on line 3—3 of FIGURE 1 and illustrates the fastener of this invention in one of its fastening positions;

FIGURE 4 is a view similar to FIGURE 3 and illustrates the fastener of this invention in another of its fastening positions;

FIGURE 5 is a view similar to FIGURE 3 and illustrates another embodiment of this invention;

FIGURE 6 is a view similar to FIGURE 5 and illustrates still another embodiment of this invention;

Figure 7:
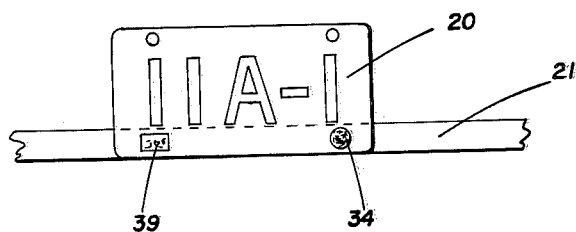
FIGURE 7 is a view similar to FIGURE 1 and illustrates the embodiments of FIGURES 5 and 6 securing a license plate to its supporting bracket.

Referring to the accompanying drawings, FIGURE 1 illustrates a license plate 20 secured to a vehicle supporting bracket 21 by a fastener of this invention which is generally indicated by reference numeral 22, at least two such fasteners 22 being utilized for each license plate 20.

As illustrated in FIGURE 2, the fastener 22 comprises a length of suitable resilient material, such as metal wire or the like, coiled in a manner to form a helix whereby successive convolutions 23 thereof are disposed in side by side relation. Fastener 22 has a pair of opposed end portions 24 and 25, the end portion 24 comprising a terminating length 26 of the material bent at an angle away from its adjacent convolution 23 and end portion 25 comprising a complete convolution 23 bent at an angle away from its adjacent convolution 23.

The end portion 24 of fastener 22 provides a lead or guide for initially threading fastener 22 into an aperture 27 formed in plate 20 and aligned with an opening 28 formed in bracket 21 whereby fastener 22 can be threaded through aligned aperture 27 and opening 28 in the manner illustrated in FIGURE 3 by rotating fastener 22 in a clockwise direction as viewed in FIGURE 1. As fastener 22 is rotated in a clockwise direction, successive convolutions 23 of fastener 22 pass through aligned aperture 27 and opening 28 so that a set 29 of convolutions 23 are disposed against the outer or exposed side 30 of bracket 21 and another set 31 of convolutions 23 are disposed against the outer or exposed side 32 of plate 20.

The end portion 25 of fastener 22 permits the same to be readily grasped to rotate fastener 22 and thread the same through the aligned aperture 27 and opening 28 in the manner illustrated in FIGURE 3.

Because of the resiliency of fastener 22, the sets of convolutions 29 and 31 tend to be drawn toward each other and, thus, frictionally force plate 20 and bracket 21 together to detachably secure the same in the position illustrated in FIGURE 3, the outside diameter of the convolution 23 being slightly greater than the diameter of the aperture 27 and opening 28.

To detach license plate 20 from bracket 21, it is merely necessary to rotate fastener 22 in a counter-clockwise direction whereby the successive convolutions 23 of fastener 22 will pass through aligned opening 28 and aperture 27 as readily as the same were threaded therethrough. However, the resiliency of the material of fastener 22 is sufficient to hold plate 20 to the bracket 21 and prevent fastener 22 from being accidentally detached therefrom by vibration and the like.

It may be desired to mount the plate 20 slightly spaced from the bracket 21 in the manner illustrated in FIGURE 4. By merely holding plate 20, spaced from bracket 21, the desired distance, fastener 22 can be threaded through opening 27 in plate 20 whereby successive convolutions 23 thereof can be threaded through opening 27 by guide means 26. When guide means 26 reaches opening 28 in bracket 21, the same will lead convolutions 23 therethrough in the manner illustrated in FIGURE 4 whereby an additional set 33 of convolutions of fastener 22 are disposed between plate 20 and bracket 21 and properly space the same.

In this manner, the outer sets 29 and 31 of convolutions 23 of fastener 22 are still tending to be drawn toward the intermediate set 33 of convolutions 23 by the resiliency of the fastening material whereby the plate 20 and bracket 21 are frictionally secured together by fastener 22.

It may be desired to fasten a reflector or the like to the exposed end of fastener 22 for ornamental and/or safety purposes. For example, as illustrated in FIGURE 5, a reflector 34 having a reflecting surface 35 is secured to a backing plate 36 that has a bushing 37 secured thereto, the bushing 37 being internally threaded at 38 in order to be threadably received on set 31 of convolutions 23 of fastener 22 after fastener 22 has secured plate 20 and bracket 21 together. In this manner, reflector 34 can be detachably secured to fasteners 22 in the manner illustrated on the right side of FIGURE 7.

Similarly, an information or advertising plate may be detachably secured to fastener 22 in the same manner as the reflector 34.

In particular, an information plate 39 has a bushing 40 secured to the rear surface thereof, bushing 40 being internally threaded at 41 to complimentarily receive convolutions 31 of fastener 22 in a threading relation to detachably secure information plate 39 to fastener 22 after the fastener 22 has secured plate 20 and bracket 21 together in the manner previously described.

Further, fastener 22 may have end portion 25 thereof removed in the manner illustrated in FIGURE 6 whereby plate 39 is mounted closer to license plate 20, if desired.

Figure 8:
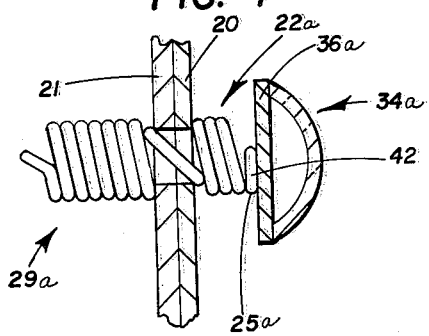
FIGURE 8 is a view similar to FIGURE 3 and illustrates another embodiment of this invention.

It is to be understood that while reflector 34 and information plate 39 are illustrated as being detachably secured to fastener 22, the same may be welded thereto in the manner illustrated in FIGURE 8. For example, reflector 34a has the rear surface of its backing plate 36a welded to the flush end portion 25a of fastener 22a at 42. Similarly, information plate 39 could be welded to fastener 22a in the same manner as reflector 34a. Thus, reflector 34a or information plate 39 can be utilized as handles for threading fastener 22a into the aligned aperture and opening.

Figures 9, 10:
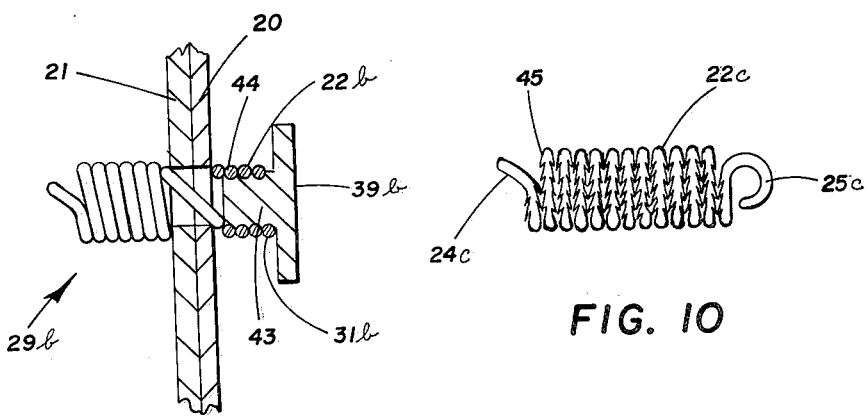
FIGURE 9 is a view similar to FIGURE 8 and illustrates still another embodiment of this invention.
FIGURE 10 is a view similar to FIGURE 2 and illustrates still another embodiment of this invention.

Further, while reflector 34 and information plate 39 are shown as telescopically receiving the exposed end of fastener 22, the same may have a portion threadably received within the convolutions 23 thereof in the manner illustrated in FIGURE 9. For example, information plate 39b may be provided with a bushing 43 extending from the rear side thereof, bushing 43 being externally threaded at 44 and being adapted to be threadably received within the set 31b of convolutions 23 of fastener 23b. Similarly, a reflector 34 may be formed in the same manner as information plate 39b to be detachably secured to fastener 22b.

In order to further secure plate 20 and bracket 21 together by fastener 22, the fastener 22 may be formed in the manner illustrated in FIGURE 10 whereby a plurality of barbs or projections 45 extend from fastener 22c in the same rotational direction whereby fastener 22c is adapted to be readily threaded in a clockwise direction to secure plate 20 and bracket 21 together. However, when fastener 22c is rotated in the counter-clockwise direction, the barbs 45 tend to grip into the respective surfaces of the plate 20 and bracket 21 and prevent ready removal thereof.

While this invention has been described as being particularly adaptable for fastening a license plate to its vehicle supporting bracket, it is to be understood that the fastener of this invention is adapted to secure a plurality of a variety of members together by merely being threadably received in aligned openings formed in the respective members.

While the foregoing presents preferred embodiments of the present invention, it is obvious that other modifications and/or equivalents may be employed without departing from the scope of the invention, which is defined in the appended claims.

What is claimed is:

A fastener comprising a length of resilient material coiled into a helix having a pair of opposed end portions, one of said end portions being bent at an angle of the order of 45° relative to its adjacent convolution to provide a guide for threading said member into an opening and the other of said ends providing means for readily turning said fastener, at least the medial convolutions of said helix having barbs projecting therefrom in the direction of the axis of said helix, said barbs projecting in the same spiral direction.

References Cited in the file of this patent

UNITED STATES PATENTS

| | | |
|---|---|---|
| 1,005,780 | Raber | Oct. 10, 1911 |
| 1,462,925 | Wilburger | July 24, 1923 |
| 1,586,904 | Kuhn | June 1, 1926 |
| 1,636,222 | Fox | July 19, 1927 |
| 2,123,527 | Golden | July 12, 1938 |
| 2,177,215 | Hodgkinson | Oct. 24, 1939 |
| 2,201,930 | Sark | May 21, 1940 |
| 2,524,293 | Lindstrom | Oct. 3, 1950 |